United States Patent [19]

Piper

[11] 4,029,265

[45] June 14, 1977

[54] WINDING FLEXIBLE STRIP MATERIAL ON CORES WITH FRUSTO-CONICAL ENDS

[75] Inventor: Leslie Herbert Piper, Fareham, England

[73] Assignee: High Temperature Engineers Limited, England

[22] Filed: Mar. 25, 1975

[21] Appl. No.: 561,975

[30] Foreign Application Priority Data

Mar. 25, 1974 United Kingdom ............ 13163/74

[52] U.S. Cl. .......................... 242/7.23; 242/158.3; 242/158.4 R; 57/11; 72/143
[51] Int. Cl.² ........................................ B65H 81/06
[58] Field of Search ............ 242/7.01, 7.21, 7.22, 242/7.23, 158.3, 158.4 R, 158.4 A; 57/11; 72/139, 143, 144

[56] References Cited

UNITED STATES PATENTS

| 601,834 | 4/1898 | Huestis | 57/11 |
|---|---|---|---|
| 1,867,596 | 7/1932 | Roseman | 242/158.3 |
| 2,676,761 | 4/1954 | Wirth | 242/7.01 |
| 3,112,895 | 12/1963 | Kinney | 242/7.21 |
| 3,614,005 | 10/1971 | Chartier | 242/7.22 |

Primary Examiner—Richard F. Aegerter
Assistant Examiner—Richard R. Stearns
Attorney, Agent, or Firm—Bich, Stewart, Kolasch and Birch

[57] ABSTRACT

A reinforced plastics material tubular rod has frusto-conical ends and a helical winding of constant angle over the tubular portion of the rod, but varying angle over the frusto-conical end portion of the rod. The winding is formed by apparatus having lead screws for moving a winding head rectilineally during winding of the tubular portion of the rod and guiding means for coordinating longitudinal and rotational movement of the winding head during winding of the frusto-conical end portions of the rod.

9 Claims, 10 Drawing Figures

WINDING FLEXIBLE STRIP MATERIAL ON CORES WITH FRUSTO-CONICAL ENDS

The present invention relates to reinforced plastics tubular structural members and to a method of, and an apparatus for, winding a strip or strand of flexible material on a cylindrical core having a frusto-conical end. Such a method and apparatus can be used, for example, in the manufacture of the reinforced plastic tubular members of the present invention. Reinforced tubular structural members have a high strength to weight ratio, and can be used for example in aircraft structures and control linkages and also in other mechanical systems.

According to the present invention there is provided a reinforced plastics tubular member characterized by having a frusto-conical end portion at at least one end of the tubular portion, and both the tubular portion and the end portion having a reinforcing winding in the form of first and second helices, each of constant angle on the tubular portion and extending over the end porion with a varying angle, the two helices being of oppsite hand.

In the present application "helix" means a curve on a developable surface which becomes a straight line when the surface is developed into a plane.

Preferably, the or each end portion embraces a frusto-conical forming surface on an end member. The end member may for example be internally screw threaded for connection to another element and may also be externally screw threaded and carry a nut for transmitted compression loads to the end portion of the tubular member.

According to a further aspect of the present invention there is provided an apparatus for winding a strip or strand of flexible material on a frusto-conical portion of a rotatable core, the apparatus comprising a carrage mounted for reciprocal movement longitudinally of the core, a feed arm for feeding the strip or strand from a spool to the core, the feed arm being mounted on the carriage for swinging movement, and means for coordinating the longitudinal movement of the carriage and the swinging movement of the feed arm in such a manner that, in use, successive turns of the flexible material deposited on the frusto-conical core portion have progressively changing angles with respect to the axis of the frustum of the core whereby a first helix is wound on the frustum as the carriage travels towards the apex of the frustum and a second helix, of opposite hand to the said first helix, is wound on the frustum as the carriage travels away from the said apex.

By winding the flexible material in helices it is possible to obtain a winding which is flat on the frustum. This is particularly advantageous where the flexible material is in strip form.

Preferably the feed arm is mounted on the carriage for pivotal movement about an axis which is perpendicular to the axis of the frustum and passes through the axis of the frustum. A single drive may be provided for the reciprocal movement of the carriage, the pivotal movement of the feed arm and the rotation of the core. The means co-ordinating the longitudinal movement of the carriage and the swinging movement of the feed arm may be a rectilinear guide which is angularly moveable about the said apex, in a plane parallel to the axis of the frustum, in such a manner as to be spaced a constant distance $rl/(R-r)$ from the apex, where $r$ is the smallest radius of the frustum, $R$ is the greatest radius of the frustum and $l$ is the length along a generator of the frustum.

The feed arm is slidable in the guide which results in flexible material being drawn on to the core frustum at changing angles. The guid both pivots the feed arm and simultaneously draws the carriage towards the apex. As the guide moves through a position that is perpendicular to the core axis the carriage is at its nearest position to the apex. Further rotation of the guide causes the carriage to move away from the apex to the maximum diameter feed positon for the frustum.

When the entire core includes a central cylindrical portion and two frusto-conical end portions, the carriage can be driven up and down the cylindrical porion by engagement of part of the carriage or feed arm with a lead screw. When one of the frusto-conical ends is reached the drive is taken over by the rotating guide.

The present invention also provides a method of winding a strip or strand of flexible material on a frusto-conical porion of a rotatable core comprising the steps of rotating the core, moving a feeding point for the flexible material longitudinally with respect to the core and drawing flexible material onto the frustum of the core from the feeding point in such a manner that successive turns of the flexible material, deposited on the frustum, have progressively changing angles with respect to the axis of the frustum whereby a first helix is wound on the frustum as the feeding point moves towards the apex of the frustum and a second helix, of opposite hand to the first helix, is wound on the frustum as the feeding point moves away from the said apex.

Such a method can be used advantageously for winding reinforcing filament, such as carbon, or glass fibre reinforced plastics, on a soluble mandrel in order to produce a high strength, low weight tube when the core has been dissolved.

The present invention will now be described by way of example, with reference to the accompanying drawings, wherein:

Figure 1:
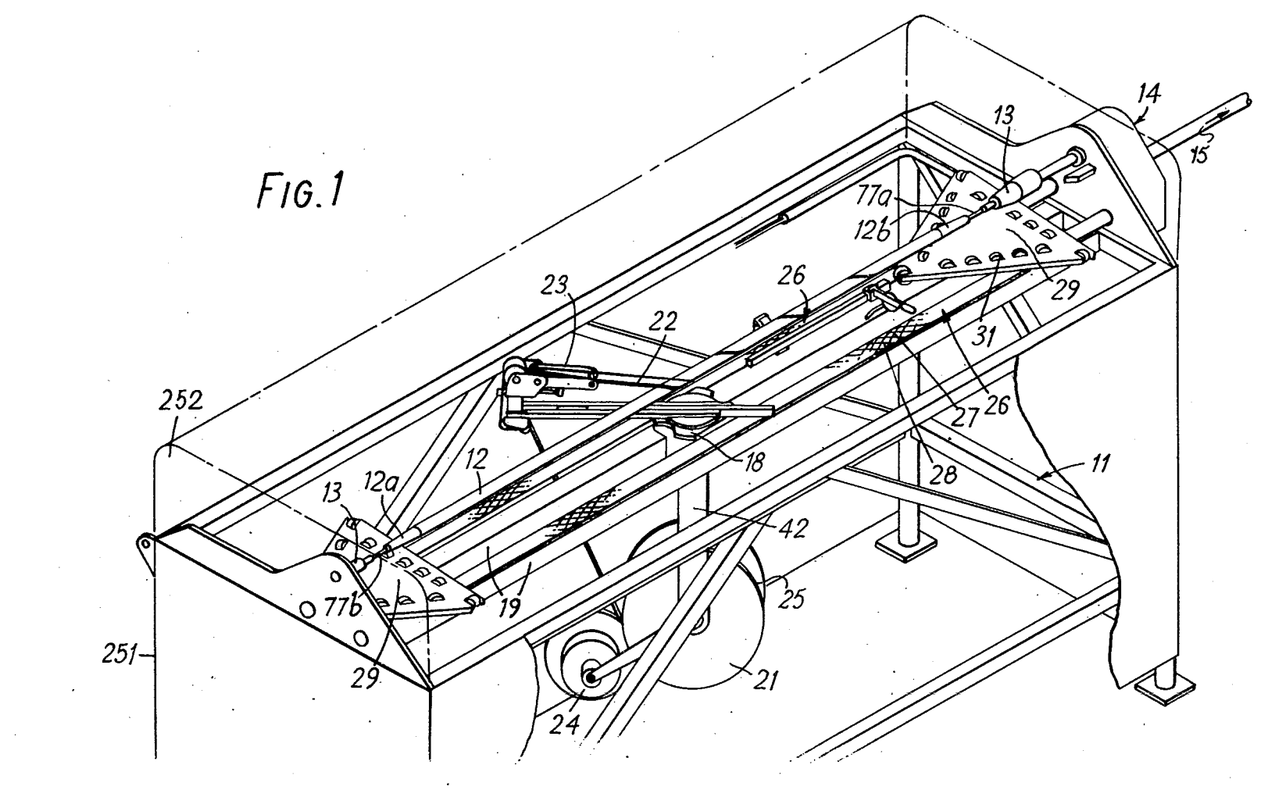
FIG. 1 is a perspective view of the apparatus according to the present invention.

In the apparatus of FIG. 1 the working parts are supported by a frame 11 constructed of angle iron. A soluble cylindrical mandrel 12 having frusto-conical end elements 12a and 12b is held between chucks 13, one of which is driven by a chain and sprocket driven 14 from a motor or handle driven shaft 15.

A carriage 18 is reciprocable parallel to the axis of the mandrel 12, along the length of the mandrel 12, on two spaced guide rails 19. The carriage 18 carries a spool 21 for storing tape 22 that is to be wound on the mandrel 12. The tape 22 is drawn onto the mandrel 12 from the spool 21 via a feed arm 23 which is mounted on the carriage 18 for pivotal movement about an axis which is perpendicular to the mandrel axis and passes through the mandrel axis. Pivotal movement of the feed arm 23 causes the tape 22 to be drawn onto the mandrel 12 at different angles to the mandrel axis.

Protective wrapping 25 on which the tape 22 may be supplied may be removed from the tape 22 by means of a spool 24 driven by a roller in frictional driving contact with the spool 21.

The carriage 18 is driven up and down the cylindrical part of the mandrel by a pair of lead screws 26, each having two sets of three equiangled helical grooves 27 and 28 of opposite hand. An element of the fed arm 23 engages in a groove 27 of each lead screw when the carriage 18 travels in one direction (right) and in the 28 when the carriage travels in the other direction (left). The lead screws 26 are turned by the chain and sprocket drive 14.

When the tape 22 has reached the end of the cylindrical part of the mandrel 12 and starts to wrap the frusto-conical end, the drive is transferred from the lead screws 27,28 (by means to be described later) to a rotating turret 29. The turret 29 drives the carriage 18 by constraining the feed arm 23 to move in a rectilinear roller guide 31 as the turret rotates about the apex of the frusto-conical end of the mandrel 12. The rotation of the turret and roller 31 causes simultaneous movement of the feed arm 23 and longitudinal movement of the carriage 18. The movement of the carriage 18 is still constrained by the guide rails 19.

Figure 4:
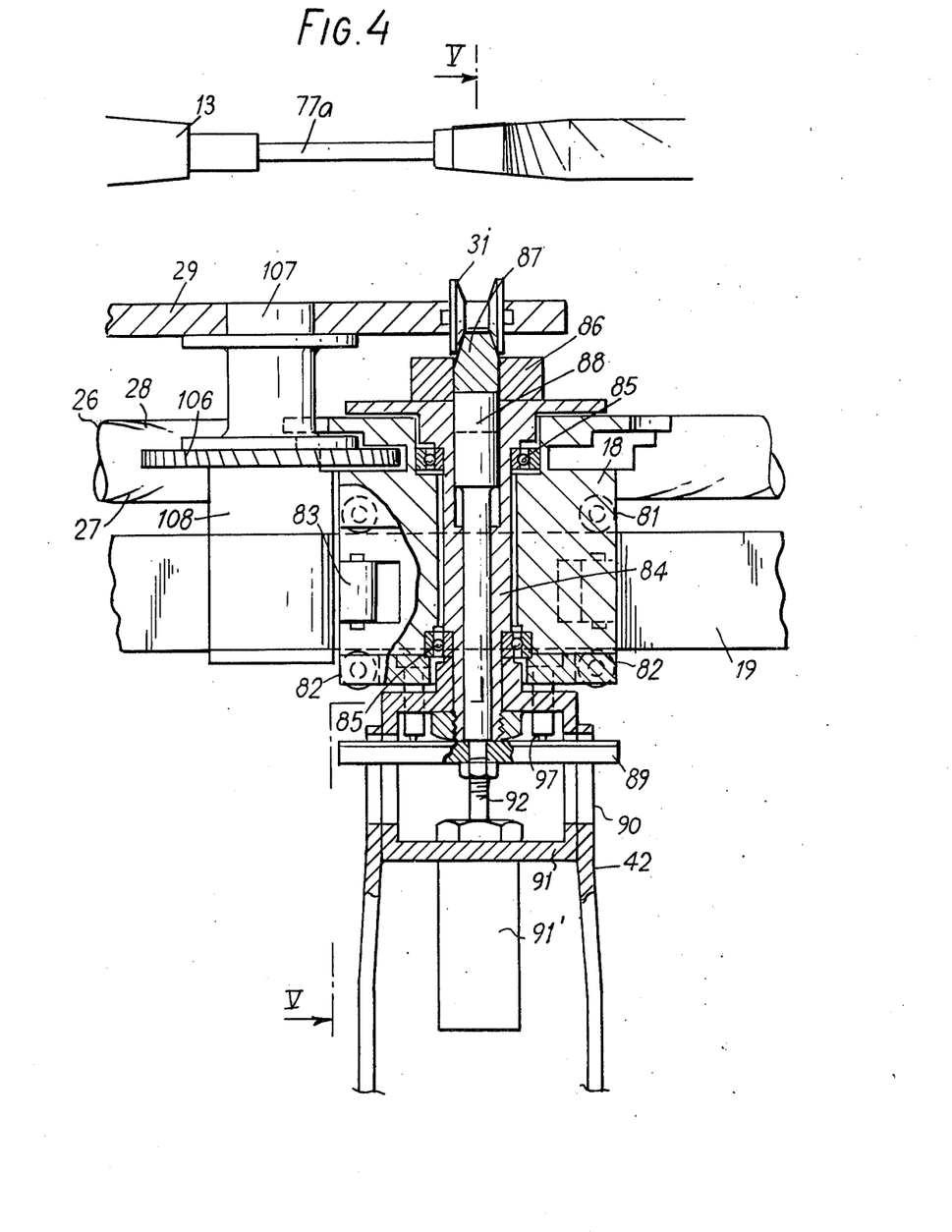
FIG. 4 is a vertical sectional view of the carriage and one turret of the machine when the carriage is in one extreme end positon of its travel, FIG. 5 A and 5B show a view on the line V—V of FIG. 4.
Figure 5A:
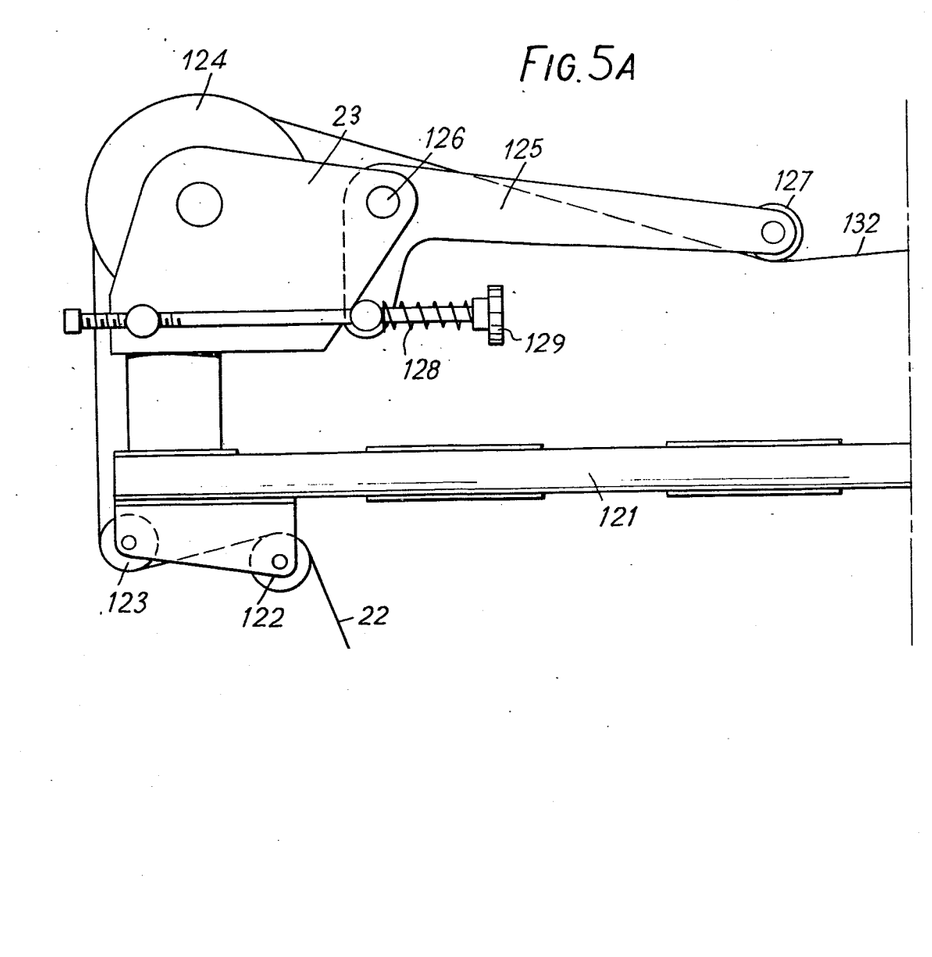
Figure 5B:
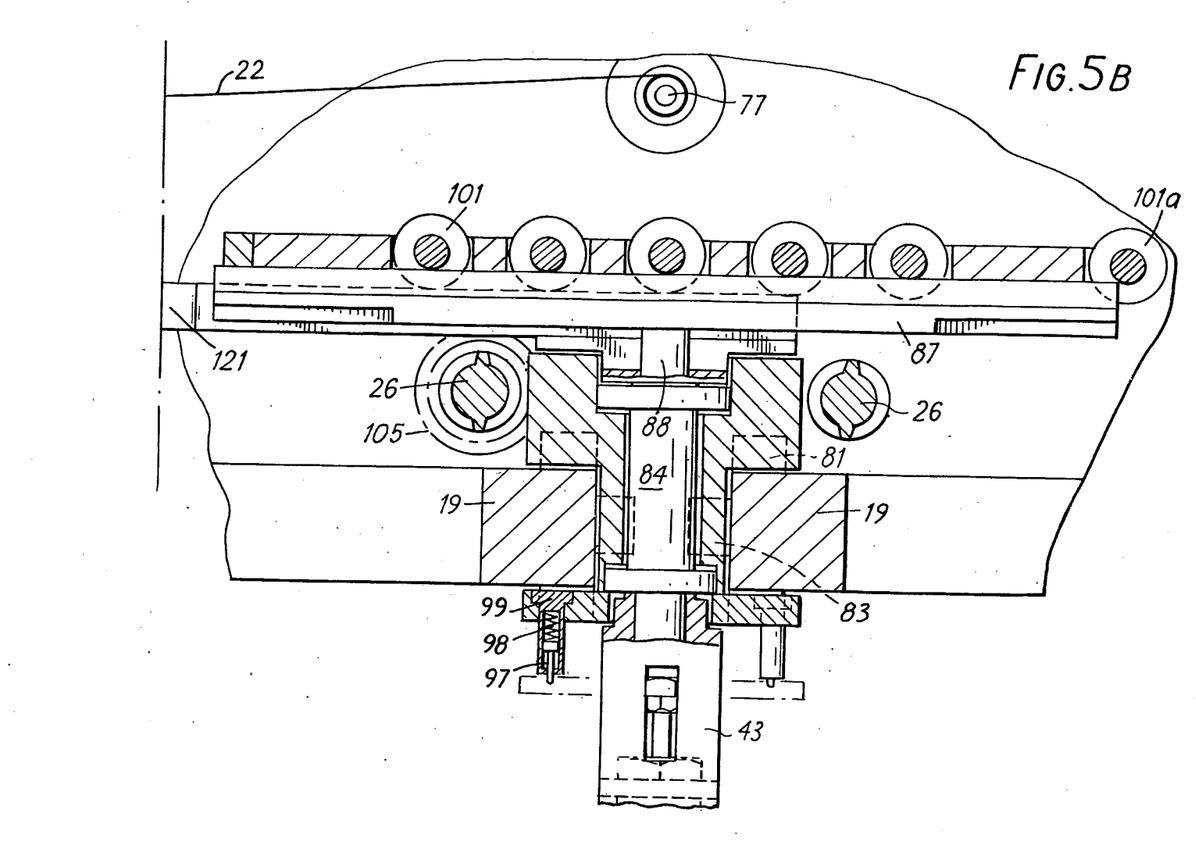
Figure 6:
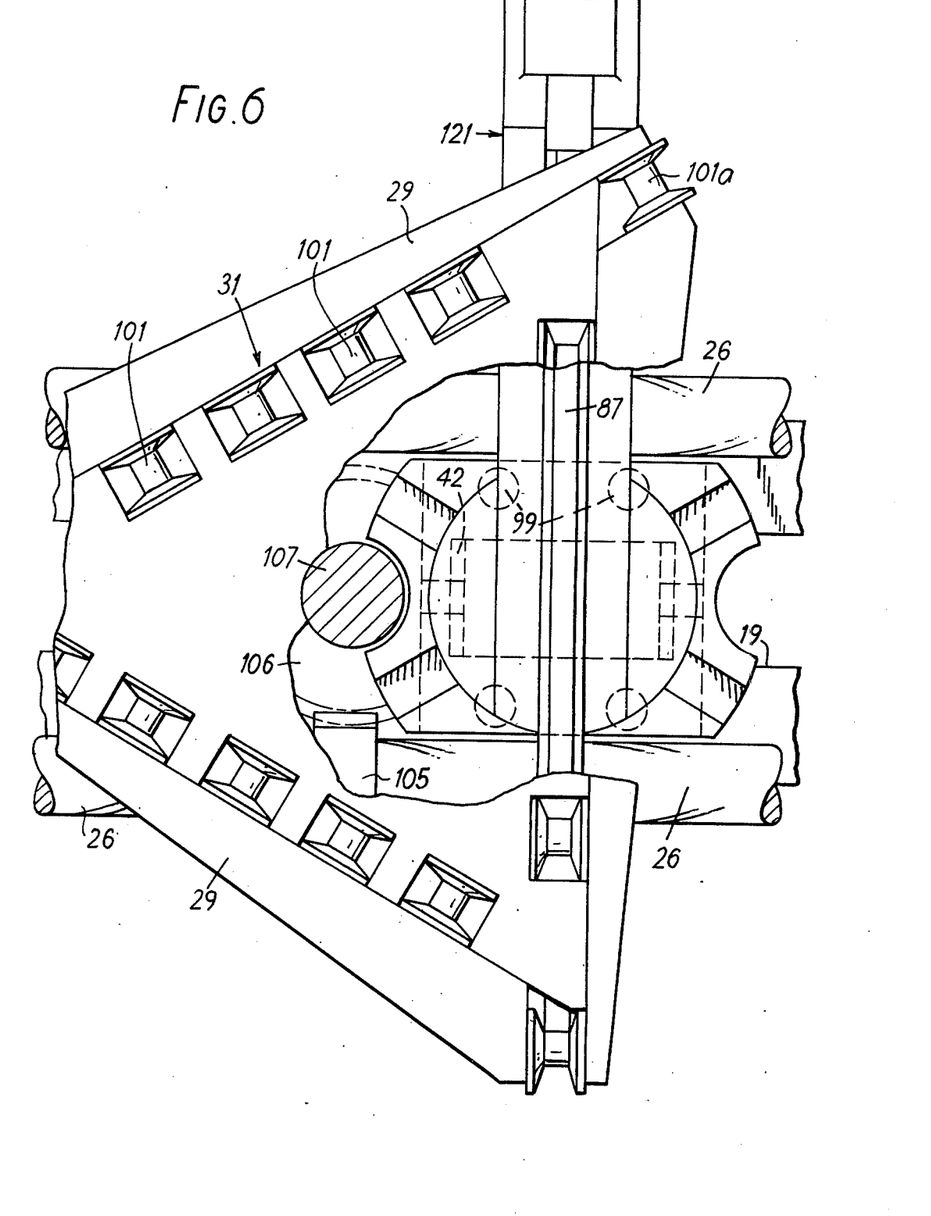
FIG. 6 is a plan view of the carriage and turret in the position shown in FIG. 4.
Figure 7:
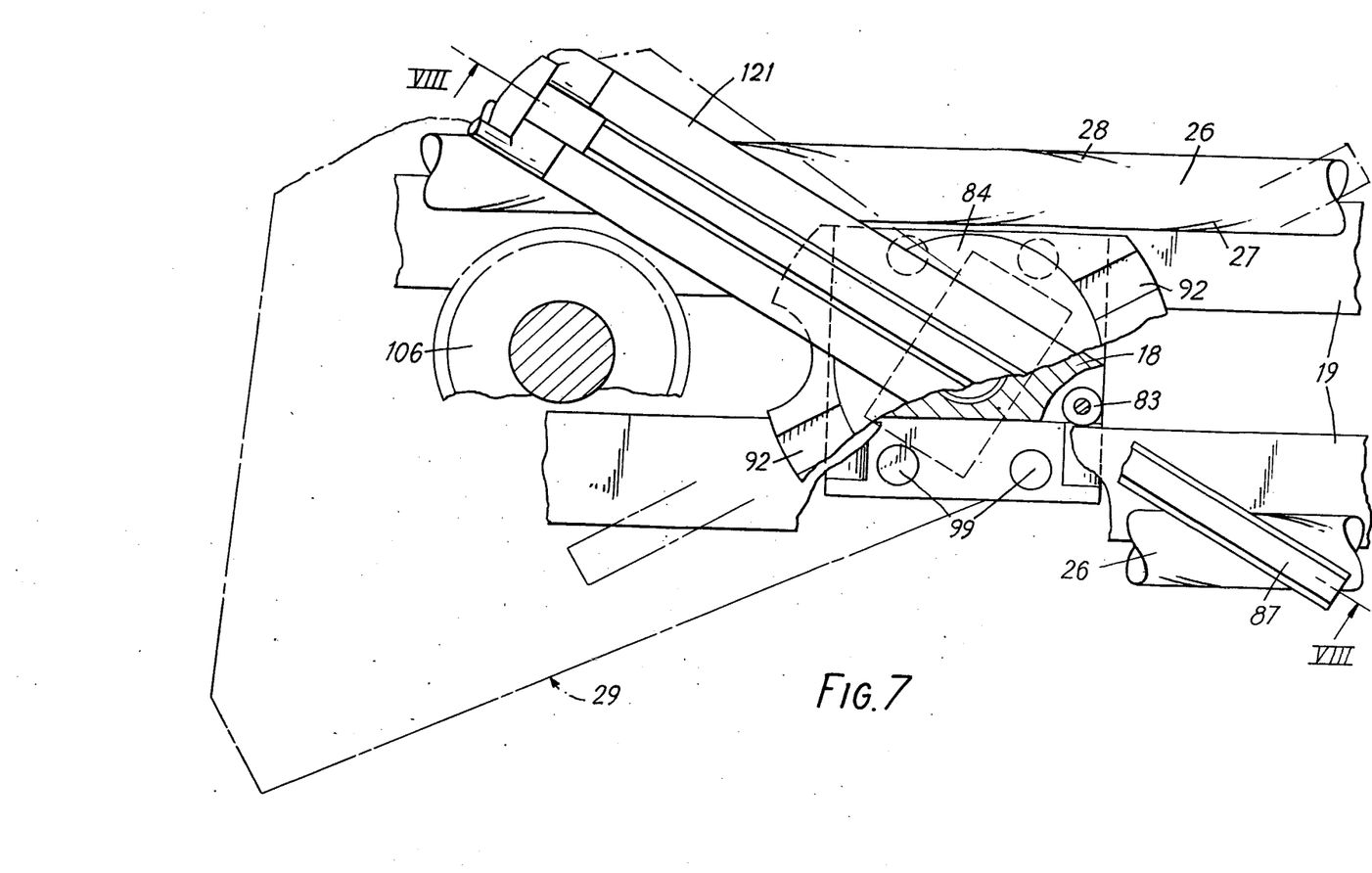
FIG. 7 is a plan view showing the carriage and winding arm in their positions at the transition from the tubular portion to the frusto-conical end porton of a winding.
Figure 8:
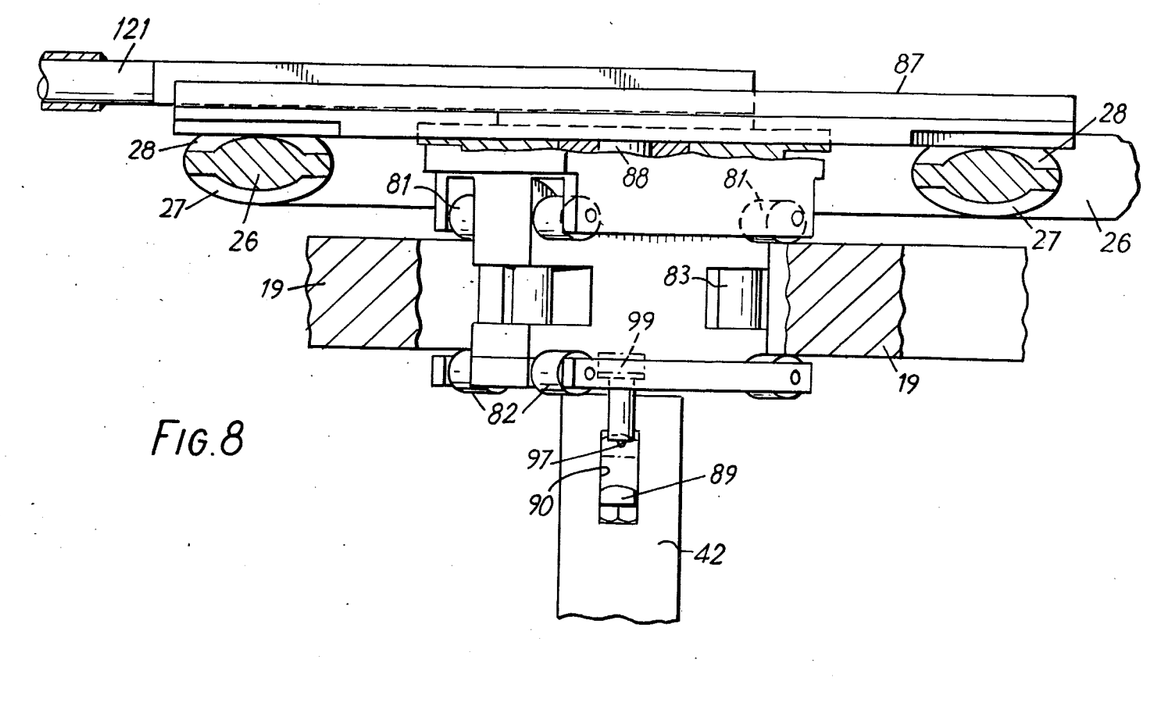
FIG. 8 is a vertical section on the line VIII—VIII of FIG. 7

The turret 29 is rotated by a worm 105, on one of the lead screws, which meshes with a worm wheel 106 on the turret (FIGS. 4 to 6).

Pivotal movement of the feed arm, by the turret 29, with respect to the axis of the mandrel 12 supplies tape to the frustum at a progressively changing helical angle so that a true helix is formed on the frustum. When the tape has reached the point where it is being drawn onto the mandrel perpendicularly to the mandrel axis, further rotation of the turret will cause the carriage to move away from the apex of the frustum and the feed arm 23 will pass the tape to the frustum in the opposite direction so that an opposite handed helix is formed which crosses the first wound helix. When the tape 22 reaches the cylindrical section of the mandrel 12 the lead screws 26 resume the drive of the carriage and the angle of the feed arm is maintained constant until the tape 22 reaches the other frusto-conical end of the mandrel.

Figure 2:
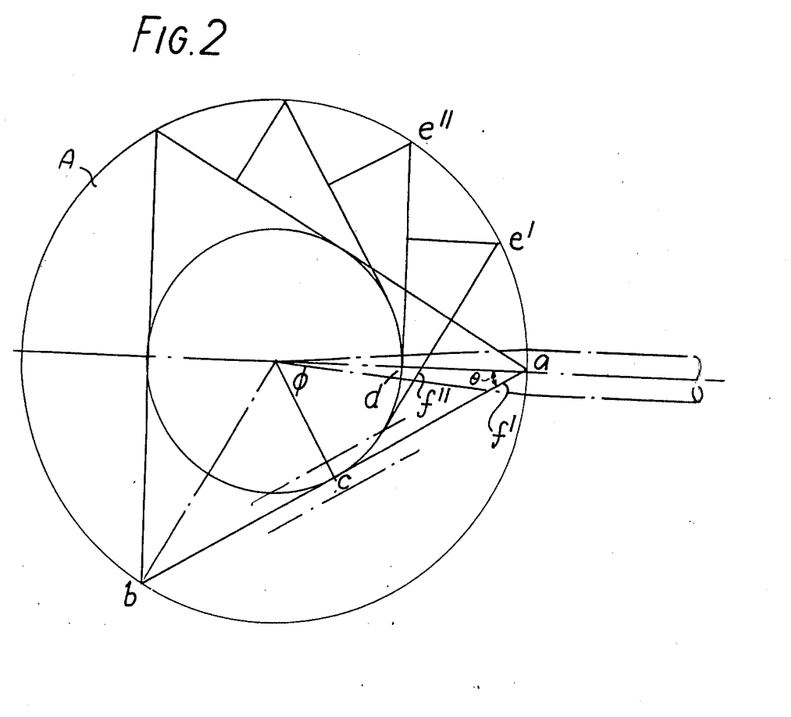
FIG. 2 is a diagram showing the mathematical concept behind the invention.

If a frustum is developed a number of times and the developed surfaces are laid side by side, an annular surface similar to that shown at A in FIG. 2 is formed. A helix wound on the frustum can be drawn on the developed surface from a point $a$ on the outside of the annulus to a point $b$ on the outside of the annulus which is tangential to the inside of the annulus at $c$.

If the dimensions of the frustum are R = greatest radius, $r$ = smallest radius and $l$ = the length along a generator of the surface, the annulus has an inner radius of $rl/(R-r)$. The angle $\theta$ between the chord $a$ $c$ $b$ and a line drawn from $a$ through the centre is then $\sin^{-1} r/R$. The annulus represents $l/(R-r)$ developments of the frustum.

The point $a$ on the line $a$ $c$ $b$ represents the point at which the tape starts winding the frusto-cone, the point $c$ represents the point at which the tape is winding perpendicular to the axis of the frustum and the point $b$ represents the point at which the tape leaves the frustum. The portion $a$ $c$ of the chord represents the helix wound towards the apex and the portion $c$ $b$ represents the helix wound away from the apex. The number of turns that the mandrel must make to wind the helix is $$\frac{\frac{\pi\phi}{180}\left(\frac{rl}{R-r}\right)}{2\pi r} = \frac{\phi}{180} \cdot \frac{l}{2(R-r)} = \frac{\phi}{360} \cdot \frac{l}{R-r}$$

where $\phi$ is the complement of $\theta$. In the embodiment of FIG. 1 $\phi = 60°$ so the mandrel must turn $l/6(R-r)$ times between $a$ and $c$.

In FIG. 2 a frustum is drawn around the center line $d$ $a$. By rotating the chord $a$ $b$ round the annulus to different positions shown at $e'e''$ etc which are spaced by the circumference of the frustum, the shape that the helix will wind on the cone can be drawn at $f'f''$ etc. Thus by rotating the chord through $(180 - 2\theta)°$ it is possible to represent the winding of the two cross helices from the greatest diameter to the smallest diameter and back again to the greatest diameter.

It will therefore be appreciated that if the turret 29 has a groove 31 or guide which rotates, at a fixed distance $rl/(R-r)$ from the equivalent apex of the frustum, in a manner equivalent to that of the chord $a$ $b$ and which is, at the beginning of the winding of the frusto-cone, angled to the mandrel axis at an angle $\theta$ (determined by the shape of the frustum as hereinbefore defined), rotation of the feed arm 23 in accordance with rotation of the groove 31 will produce the required helices.

The helical angle which is needed on the cylindrical part of the mandrel is determined by the angle at which the tape leaves the frustum and will therefore be different for different shaped frustums.

The ratio between the rotation of the turret and the mandrel can also be seen to be $l/(R-r)$ turns of the mandrel to one turn of the turret.

Figure 3:
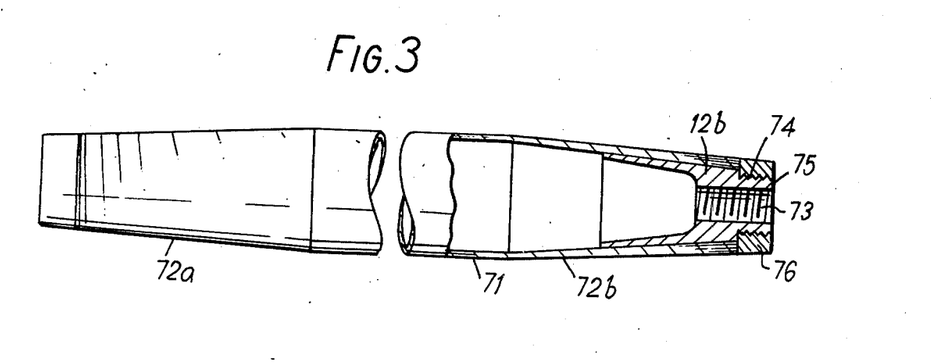
FIG. 3 shows a completed plastic reinforced tubular rod in accordance with the present invention, the right hand end portion of the rod being shown in axial section.

The tubular rod to be wound is shown in FIG. 3. The rod has a central tubular portion 71 and two frusto-conical in the porions 72a and 72b the smaller ends of which are formed around correspondingly shaped frusto-conical surfaces on the exterior of the members 12a and 12b. The latter are formed for example of high strength aluminium or titanium alloy and are internally screw threaded at 73 for connection to other elements of the structure or linkage in which they are to be employed and are also externally screw threaded at 74 at their outer ends 75 and receive cuff nuts 76 which assist in transmitting compression loads to the tubular member.

The tubular portion 71 and the frusto-conical end portions 72a and 72b are formed from a resin-impregnated tape made up of filaments such as glass fibre or carbon (graphite) fibre filaments each of which may have a diameter for example of 1/10,000th of an inch. The tubular member may have a number of internal longitudinal plies of this tape around which further tape is wound helical, in this embodiment at 30° to the axis in the case of the tubular portion 71 and progressively increasing angle as shown in the case of the end portion 72a.

To form the rod shown in FIG. 3, a soluble mandrel is formed around a rod passing through the threaded aperture 73 in the two end members 12a and 12b which are for this purpose spaced apart at the correct distance on the rod. The mandrel may be moulded from a suitable plaster and has an external shape corresponding to the internal shape of the tubular rod shown in FIG. 3.

The completed mandrel assembly thus formed is mounted in the apparatus shown in FIG. 1 with the two projecting ends of the rods 77a and 77b fixed in the two chucks 13. Any required preliminary straight piles are applied mandrel and then the tape from the drum 21 is helically wound around the mandrel in accordance with the process of the invention. It is found convenient to warm the tape, conveniently just before it is wound onto the mandrel, to render it more pliable and tacky.

After the winding has been completed, the same apparatus may be used to wind a self adhesive cellulose tape around the outside of the completed winding to hold it in place during the curing of the resin.

DETAILED DESCRIPTION OF THE APPARATUS

The winding apparatus is shown in detail in FIGS. 4 to 8. The carriage 18 is mounted for movement along the rails 19 by means of sets of rollers 81 and 82 which engage the upper and lower surfaces of the rails 19 and further sets of rollers 83 which engage the inner side surfaces of the rails 19. The tape spool 21 is rotatably mounted in a strrup 42 which is carried by the lower end of a tubular shaft 84 supported by spaced ball races 85 in a vertical bore in the carriage. The upper end of the tubular shaft 84 carries a channel 86 which receives a cross bar 87 the upper surface of which is conformed to cooperate with both the rules 27 and 28 in the lead screws and with the roller guides 31.

The center of the cross bar 87 is secured to a shaft 88 extending through the interior of the tubular shaft 84 and terminating at its lower end in a transverse bar 89 guided in slots 90 in the stirrup 42. A cross member 91 of the stirrup 42 carries a double-acting pneumatic cylinder 91' the piston rod 92 of which is secured to the shaft 88 and bar 89. The cylinder 91 can thus move the cross bar 87 between a raised position in which it can make engagement with the rollers of the guide 31 and a lowered position in which its under-surface is engaged with one of the grooves 27 or 28 in each of the two lead screws.

Operation of the pneumatic cylinder 91' is controlled by a photo-electric detector (not shown) which operates a control valve for the cylinder 91' each time the carriage reaches a position corresponding to the junction of a frusto-conical end portion with the main tubular portion of the tubular member.

When the cross bar 87 is in its lowered position and in engagement with the lead screw grooves, it is locked against angular movement by seating in grooves in the top surface of the carrier.

In order to prevent the carriage from becoming misplaced due to continued motion as the result of its momentum during changeover of the cross bar 87 between the lead screws and the guides 31, the bar 89 is arranged to come into contact with rounded ends of brake plungers 97 which supports springs 98 which in turn bear against brake pads 99 which can make frictional contact with the under sides of the rails 19 when the bar 89 cams the plungers 92 upwards. This braking action only takes place for a very short time since the bar 89 releases the plungers either by its swinging action or by downward movement by the cylinder 91.

Each of the turrets 29 (FIGS. 5A, 5B and 6) comprises a substantially triangular plate in which three rectilinear roller guides 31 are mounted to define an equilateral triangular. Each guide 31 comprises five freely rotatable rollers, four of which are grouped together while the fifth 101a lies beyond the line of the next adjacent roller guide 31 in the carriage 29. Thus, when the cylinder 91 moves a cross bar 87 up out of engagement with the lead screws into engagement with the underside of the roller guide 31 the roller 101a will be on the opposite side of the axis of the shaft 88 to the other four rollers 101. This enables the carriage 29 to transmit a rotating torque to the cross bar 87 and thus to the stirrup 42 without generating excessive lateral forces in the bearing 85.

Each turret 29 is continuously rotated by a worm 105 fixed to one of the lead screws and meshing with a worm wheel 106 (FIG. 4) on a shaft 107 to which the turret 29 is secured at its upper end and which is supported at its lower end in a bearing structure 108 fixed to the frame 11. This worm drive to the turret 29 ensures synchronism between the movements of the turrets and the lead screws, thereby ensuring that at the point of winding corresponding to the transition from the tubular portion to the end portion, one of the guides 31 is directly above and in register with a groove of each of the lead screws.

One end of the channel 86 is extended to form a support broom 121 carrying the winding head 23 in which a path for the tape 22 is defined by a series of rollers 122, 123 and 124. The head 23 includes a pivotally mounted bell crank 125 crank 125 having its pivot at 126 and carrying a tensioning roller 127 at its free end. A spring 128 bears against the short arm of the bell crank 125 and is adjustably tensioned by a screw 129. the head 23 may also carry means for warming the portion 132 of the tape after it has left the rollers 127. These means may comprise for example a nozzle supplied with heated air.

In operation, with one end of the tape 22 engaged around the mandrel, the latter is rotated by the motor drive and draws tape from the spool 21 through the roller system in the winding head 23. At the same time, the lead screws 26 move the carriage along at a steady speed so that a helical winding is formed on the straight sided tubular portion of the mandrel. As soon as the winding reaches an end of this straight portion, the detector operates the air cylinder 91' to lift the cross bar 87 out of the engagement with the lead screws and into engagement with the appropriate guide 31 in its turret 29. The rotating turret and its guide constrain the stirrup 42 carrying the spool together with the winding head 23 to move angularly and to draw the carriage along further at a decreasing speed so that a flat helical winding is formed on the frsuto-conical end portion without kinks or wrinkles. In the extreme end position of the carriage, the cross bar 87 is perpendicular to the axis of the mandrel 12. Continued rotary movement of the turret 29 begins to return the carriage at progressively increasing speed thereby starting a new helical winding of opposite hand to that which has just been formed. In order to ensure that the various successive windings are uniformly distributed around the circumference of the trubular rod, the drive to the lead screws and thus also to the turret 29 may be interrupted for a short interval at some convenient point, preferably when the carriage is at one extreme end of its travel and is thus stationary. Further, where the lead screws have multi-start helical grooves 27 and 28, the distance between the ends of the tubular or cylindrical portion of the rod need not correspond to an integral number of revolutions of the lead screws. To ensure that the turret is in the correct angular position with its guide ready to receive the cross bar 87, the drive to the mandrel may be temporarily interrupted during the straight portion of a winding and at the same time the cylinder 91' may be operated to temporarily disengage the cross bar 87 from the lead screws. As soon as the correct groove of the lead screws is in register with the cross bar 87, the cylinder 91' is operated again to re-engage the cross bar with the appropriate groove of the lead screws and simultaneously the drive to the mandrel is resumed. With this arrangement, the correct distribution of the windings around the circumference may be similarly achieved, the mandrel being rotated through the required angle before resuming the drive.

Figure 9:
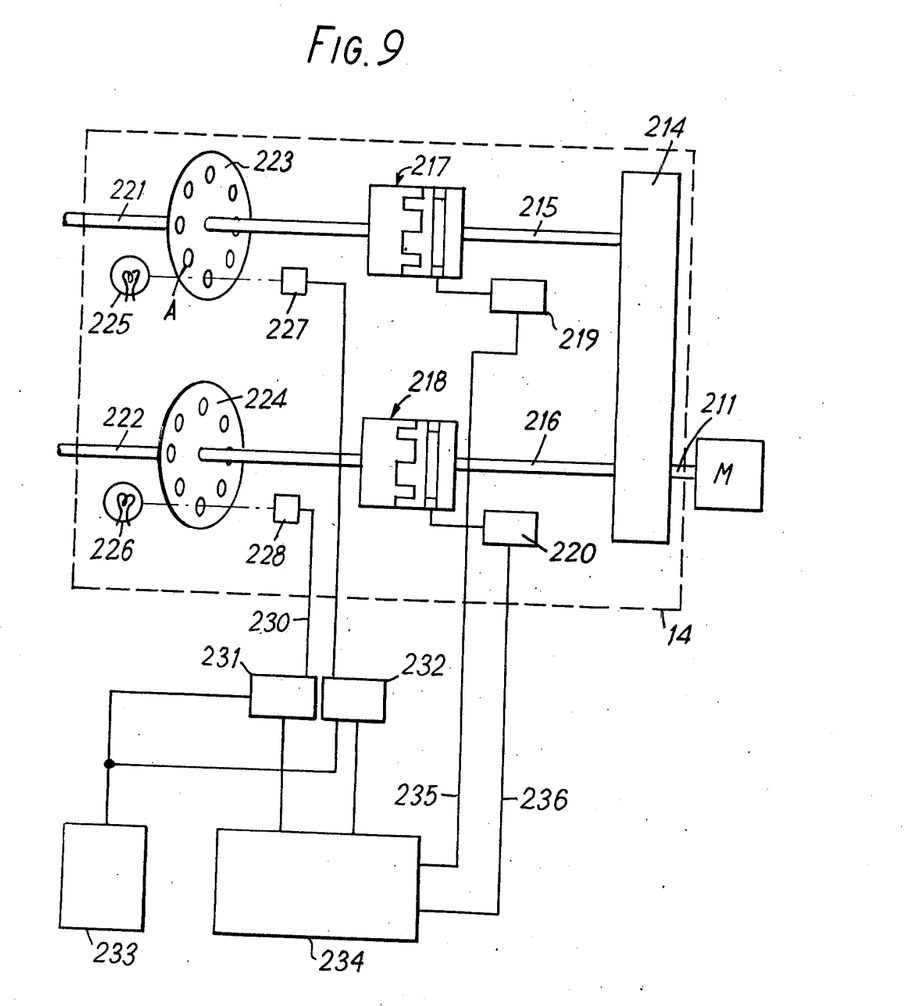
FIG. 9 shows diagrammatically a control arrangement for the apparatus.

FIG. 9 shows diagrammatically a control system for achieving these objects. An electric Motor drives the input 211 to a gearbox or chain and sprocket drive 214 having a first output 215 for driving the mandrel and a second output 216 for driving the lead screws 26. Each of the drives 215, 216 can be selectively disengaged by a respective clutch 217, 218, each of which has an electrically operated actuator 219, 220 respectively. The output elements of the clutches 217 and 218 are connected to drive shafts 221 and 222 leading to the mandrel chuck 13 and one to one drive to the two lead screws respectively, and each of the shafts 221 and 222 carries a perforated counting disc 223, 224.

Each of the discs 223 and 224 intervenes a lamp 225, 226 and photo-electric detector 227, 228 which produces an output pulse each time an aperture A in the respective disc 223, 224 moves across the light path between the lamp and detector.

The outputs of the detectors 227, 228 are fed by wires 229, 230 to counters 231, 232 which are under the control of a programmer 233 and logic circuitry which in turn has outputs 235, 236 connected to the clutch actuators 219, 220.

With this arrangement, the counters 231 and 232 can signal to the programmer 233 and logic circuit 234 the instant at which the lead screws 26 have brought the winding head to an extreme end of the winding (or any other predetermined position) and the programmer 233 can then instruct the circuitry 234 to cause the actuator 220 to disengage the drive to the shaft 222 until a predetermined number of impulses, determined by the programmer 233, has been delivered by the detector 227 to indicate that the mandrel shaft 221 has turned through the appropriate angle, whereupon the circuitry 234 instructs re-engagement of the clutch 218 for the winding to be resumed.

In a simplification of the apparatus of the invention (not specifically illustrated), the input to the gearbox 14 (FIG. 1) may carry a simple crank handle and the cylinder 91' may be replaced by a simple manually operated or automatically tripped device for moving the cross bar between the lead screws and the respective turret guide. For this purpose, it is possible to dispense with one of the lead screws and to pivot the cross bar adjacent one of its ends, in the winding head structure.

In the embodiment shown in FIGS. 1 to 9, it is desirable to maintain a clean warm atmosphere around the mandrel during winding. For this purpose, a casing 251 (FIG. 1) having a hinged lid 252 surrounds the entire apparatus, the lid 252 permitting access to the interior of the apparatus.

I claim:

1. An apparatus for winding a strip or strand of flexible material on a frustum-forming portion of a rotatable core, comprising means for rotatably mounting and for rotating a core about an axis, a carriage mounted for reciprocal movement longitudinally of the core, carriage drive meand for longitudinally moving the carriage, a feed arm for feeding the strip or strand from a spool to the core, the feed arm being mounted on the carriage for swinging movement about an instantaneous axis transverse to the core axis, and means for coordinating the longitudinal movement of the carriage and the swinging movement of the feed arm to increase the angle that the strip or strand makes to the axis of the core as th carriage moves in the direction towards the smaller end of the frustum, said carriage stopping and reversing direction as said arm passes through an approximately 90-degree angle with respect to the core axis, and to continue to swing the feed arm in the same angular direction during return movement of the carriage towards the larger end of the frustum in such a manner that successive turns of the flexible material deposited on the frustum have progressively changing angles with respect to the axis of the core.

2. Apparatus according to claim 1, wherein the means coordinating the longitudinal movement of the carriage and the swinging movement of the feed arm is a rectilinear guide for an element associated with the feed arm, the said guide being angularly movable about the apex of the frustum, in a plane substantially parallel to the axis of the frustum, in such a manner that the guide is maintained tangent to a circle centered at said apex and having a radius of $rl/(R-r)$, where $r$ is the smallest radius of the frustum, $R$ is the greatest radius of the frustum, and $l$ is the length along a generator of the frustum.

3. Apparatus according to claim 2, wherein the guide comprises a row of rollers mounted in a turret which is itself mounted for rotation about the said apex in a plane substantially parallel to the axis of the frustum.

4. Apparatus according to claim 3, wherein one of the said rollers lies on the opposite side of the axis of swinging movement of the feed arm to the remainder of the rollers of the guide while the largest diameter portion of the frustum is being wound.

5. Apparatus according to any of claims 1, wherein longitudinal movement of the carriage is effected by a rotationally driven lead screw having two sets of helical formations of opposite hand.

6. Apparatus according to claim 5, wherein the means coordinating the longitudinal movement of the carriage and the swinging movement of the feed arm is a rectilinear guide for an element associated with the feed arm, the said rectilinear guide being angularly movable about the said apex, in a plane parallel to the axis of the frustum in such a manner that the guide is maintained tangent to a circle centered at said apex and having a radius of $rl/(R-r)$, where $r$ is the smallest radius of the frustum, $R$ is the greatest radius of the frustum, and $l$ is the length along a generator of the frustum, the said element element of the feed arm is movable between a first position in which it is disengaged from the guide and engaged with the lead screw and a second position in which it is disengaged from the lead screw and engaged with the guide, and the apparatus includes means for moving the element between the two said positions.

7. Apparatus according to claim 6, comprising a pair of the said screws disposed with their axes substantially parallel to one another, the said element comprising a cross bar engagable with and disengagable from both lead screws simultaneously.

8. Apparatus according to any of claims 5, and including control means for temporarily disconnecting the drive to at least one of the rotatable core and the lead screw.

9. Apparatus according to claim 8 and including means for measuring the rotation of the core and of the lead screw and programmable control means connected to said measuring means, said control means being responsive to said measuring means and being operative to control starting and stopping of the drives to the core and lead screw in accordance with a preestablished program.

* * * * *